United States Patent
Lamarre et al.

[11] Patent Number: 6,098,753
[45] Date of Patent: Aug. 8, 2000

[54] SYSTEM FOR DELIVERING PRESSURIZED LUBRICANT FLUIDS TO AN INTERIOR OF A ROTATING HOLLOW SHAFT

[75] Inventors: Sylvain Lamarre, Longuouil; Sylvain Brouillet, St. Basile-le-Grand, both of Canada

[73] Assignee: Pratt & Whitney Canada Corp., Longueuil, Canada

[21] Appl. No.: 09/090,955

[22] Filed: Jun. 5, 1998

[51] Int. Cl.⁷ .................................................... F01M 1/00
[52] U.S. Cl. ...................... 184/6.11; 277/579; 277/931; 277/938
[58] Field of Search ........................ 184/6.11; 277/938, 277/637, 650, 931, 579, 559

[56] References Cited

U.S. PATENT DOCUMENTS

| | | |
|---|---|---|
| 3,268,232 | 8/1966 | Richards . |
| 3,333,856 | 8/1967 | Voitik . |
| 3,746,128 | 7/1973 | Wunsch ................................... 184/6.11 |
| 3,810,640 | 5/1974 | Ahlen ................................... 277/235 A |
| 3,837,659 | 9/1974 | Moncrief ................................... 277/74 |
| 3,874,676 | 4/1975 | Taylor et al. . |
| 3,971,563 | 7/1976 | Sugimura . |
| 4,013,141 | 3/1977 | James ................................... 308/177 |
| 4,050,701 | 9/1977 | Webb ................................... 277/125 |
| 4,251,186 | 2/1981 | Chomel et al. . |
| 5,119,905 | 6/1992 | Murray . |
| 5,246,087 | 9/1993 | Schippen . |
| 5,303,936 | 4/1994 | Kvroki ................................... 277/165 |
| 5,540,451 | 7/1996 | Ohta et al. ................................... 277/229 |

FOREIGN PATENT DOCUMENTS 1503753  3/1978  United Kingdom .

*Primary Examiner*—David M. Fenstermacher
*Attorney, Agent, or Firm*—Jeffrey W. Astle

[57] ABSTRACT

A system for delivering a pressurized lubricant fluid from a stationary source to an interior of a drive shaft of a gas turbine engine which rotates at high speed and operates at high temperatures, includes a pair of axially spaced-apart seals that surround the shaft. The pressurized lubricant fluid is delivered to a radial passage defined between the seals. To ensure reliable operation under the high speed and high temperature conditions, the seals are constructed so that a film of the lubricant fluid is formed between the rotating shaft and the seals. The seals float on the film and wear is reduced. In order to minimize variations in the space between the seals and the shaft caused by changes in operating temperatures, each seal is surrounded by a control ring of material having a coefficient of expansion similar to the material of the shaft. The advantage is reliable delivery of lubricant to a shaft rotating at high speed in a high temperature environment.

15 Claims, 1 Drawing Sheet

SYSTEM FOR DELIVERING PRESSURIZED LUBRICANT FLUIDS TO AN INTERIOR OF A ROTATING HOLLOW SHAFT

TECHNICAL FIELD

The present invention relates to the delivery of a lubricant fluid to the interior of a rotating hollow shaft and, in particular, to a system for such lubricant fluid delivery into power shafts which operate at high speed in high temperature environments.

BACKGROUND OF THE INVENTION

There are many mechanical constructions which benefit from the delivery of lubricating fluid to an interior of a rotating shaft. One such construction is found in gas turbine engines where drive splines between an internally splined drive shaft and an externally splined driven shaft are lubricated by a supply of lubricant fluids trapped in an annular reservoir within the drive shaft. In order to ensure a sufficient supply of lubricant fluid in the annular reservoir, it is desirable to deliver lubricant fluid to the reservoir from a source. However, the centrifugal forces generated by the rotation of the shaft tends to eject lubricant fluid from the hollow shaft, so lubrication is difficult to achieve using conventional methods of lubrication such as immersion in lubricant fluid. Consequently, a pressurized delivery system is required.

Systems for delivering a pressurized lubricant fluid into a rotating hollow shaft, are known. For example, U.S. Pat. No. 5,119,905, which issued on Jun. 9, 1992 to Murray, describes an accessory drive spline lubrication system for a turbine engine reduction gear box. In this system, one or more nozzles spray a stream of engine oil directed at an angle towards the axis of the drive shaft and towards orifices in the drive shaft. The nozzles are stationary relative to the drive shaft. Each nozzle directs a stream of lubricant toward an annular reservoir located near the splines, the streams being aimed at the orifices. The streams of lubricant, however, are intermittently interrupted by the rotation of the drive shaft.

As a further example, U.S. Pat. No. 5,246,087, which issued on Sep. 21, 1993 to Schippen, discloses a device for radially transporting a medium to a rotating station. The device includes a bearing assembly having a stationary outer cylinder with a lubricant feed, an inner cylinder which is rotatable together with a receiving station that is coupled via rotation bearings to the outer cylinder. The two sealing rings seal opposite ends of the housing and form a passage for lubricant fluid medium. The patent emphasizes that, in all conditions, the medium for transfer (lubricating fluid) cannot leak into the environment. This device is therefore unsuitable for use in high temperature operating environments such as encountered in turbine engines because the leak-proof seals would likely fail under such conditions.

Yet another example is disclosed in U.S. Pat. No. 4,251,186 which issued on Feb. 17, 1981, to Chomel et al. This patent discloses a device for circulating fluid in a hollow shaft. The device includes a fixed stator coaxial with the hollow shaft which passes through it, forming an annular chamber around the hollow shaft and a rotor within the chamber. The rotor includes a plurality of radial bores. When the shaft is rotated, a centrifugal force acts on the oil in the radial bores to drive the oil into the chamber and to draw oil through a port around the shaft in the stator. The pressure established in the chamber overcomes the centrifugal force generated by rotation of the shaft and drives the oil in the chamber through radial bores into an interior of the hollow shaft. An annular separating wall around the shaft within the chamber is fixed to the chamber and defines, together with a sidewall of the stator, an annular intake chamber which directs the pressurized oil into the radial hole of the shaft.

A drive shaft of a gas turbine engine typically operates at rotational speeds of up to about 6000 RPM and at temperatures of up to about 200 degrees F. As a result, to be delivered to the interior of the hollow shaft lubricant fluid must be under pressure.

A lubricant system used for the power shafts and accessory drive shafts of gas turbine engines is located within a housing in which the shafts are rotatably mounted and a certain amount of leakage is permitted. However, leakage reduces the pressure at which the lubricant fluid is delivered and seals having too much clearance are not acceptable for applications such as the high speed, high temperature and high lubricant fluid pressures associated with gas turbine engines.

SUMMARY OF THE INVENTION

It is therefore an object of the invention to provide a system for delivering pressurized lubricant fluids to an interior of a rotating hollow shaft and to overcome the shortcomings in the above discussed prior art.

It is another object of the invention to provide means for delivering pressurized lubricant fluid to an interior of a rotating hollow shaft which operates at high rotational speed and devoted temperatures.

In one aspect of the present invention, there is provided an apparatus for delivering a pressurized lubricant fluid from a stationary source to an interior of a hollow shaft rotatably mounted in a housing comprising a pair of seals adapted to be mounted around an external periphery of the hollow shaft, the pair of seals respectively having an inner periphery spaced from the external periphery of the hollow shaft to an extent that promotes a formation of a film of the lubricant fluid between the seals and the hollow shaft while inhibiting a free flow of the lubricant fluid therebetween, the seals being axially spaced apart and flanking a radial passage having fluid communication with the stationary source and the interior of the hollow shaft, and the seals being supported in an axially restrained, radially unrestrained position with respect to the housing so that the seals float on the film of the lubricant fluid.

In another aspect of the present invention, there is provided a method for delivering a pressurized lubricant fluid from a stationary source to an interior of a hollow shaft rotatably mounted in a housing comprising: supporting a pair of seals in an axially restrained, radially unrestrained position with respect to the housing, the seals surrounding an external periphery of the hollow shaft in a fixed axially spaced apart position, an interior of each seal being spaced radially from the external periphery of the hollow shaft to an extent that promotes a formation of a film of the lubricant fluid between the seals and the hollow shaft while inhibiting a free flow of the lubricant fluid therebetween so that the seals float on the film of the lubricant fluid; providing at least one bore in the hollow shaft which communicates with the interior of the hollow shaft and aligns with a radial passage formed between the pair of axially spaced-apart seals; and supplying pressurized lubricant fluid from the source to the radial passage to form the film of the lubricant upon which the seals float and deliver the lubricant fluid into the interior of the hollow shaft.

According to a further aspect of the present invention, there is provided a system for delivering a pressurized lubricant fluid from a stationary source to an interior of a hollow shaft rotatably mounted in a housing comprising: a pair of seals surrounding an external periphery of the hollow shaft, the pair of seals respectively having an inner periphery spaced from the external periphery of the hollow shaft to an extent that promotes a formation of a film of the lubricant fluid between the seals and the hollow shaft while inhibiting a free flow of the lubricant fluid therebetween, the seals being axially spaced apart and flanking a radial passage; a retainer removably secured to the housing and supporting the seals in an axially restrained, radially unrestrained position with respect to the housing so that the seals float on the film of the lubricant fluid and form the radial passage which is in fluid communication with the stationary source; and a bore in the hollow shaft in fluid communication with the radial passage and the interior of the hollow shaft.

The invention therefore provides an apparatus, method and system for delivering lubricant fluid to an interior of a drive shaft which rotates at high speed. The apparatus comprises a pair of fluid seals which surround the hollow shaft and flank a radial passage that has fluid communication with a stationary source of pressurized lubricant fluid. The seals are axially constrained but radially unconstrained so that they float on a film of lubricant that forms between the seals and the drive shaft. Wear of the seals and the shaft is thereby reduced. In order to control a width of the gap and ensure that the thickness of the lubricant film is consistent, a control ring is provided around each seal. The control rings are bonded to the seals, and are preferably made from the same material as the drive shaft so that they have the same coefficient of thermal expansion. The control rings ensure that a clearance between the seals and the drive shaft is substantially constant so that the film of lubricant fluid is formed while a free flow of lubricant fluid between the seals and the drive shaft is inhibited.

BRIEF DESCRIPTION OF THE DRAWINGS

The present invention will now be further described by way of example only and with reference to the accompanying drawings wherein.

DETAILED DESCRIPTION OF THE PREFERRED EMBODIMENT

Figure 1:
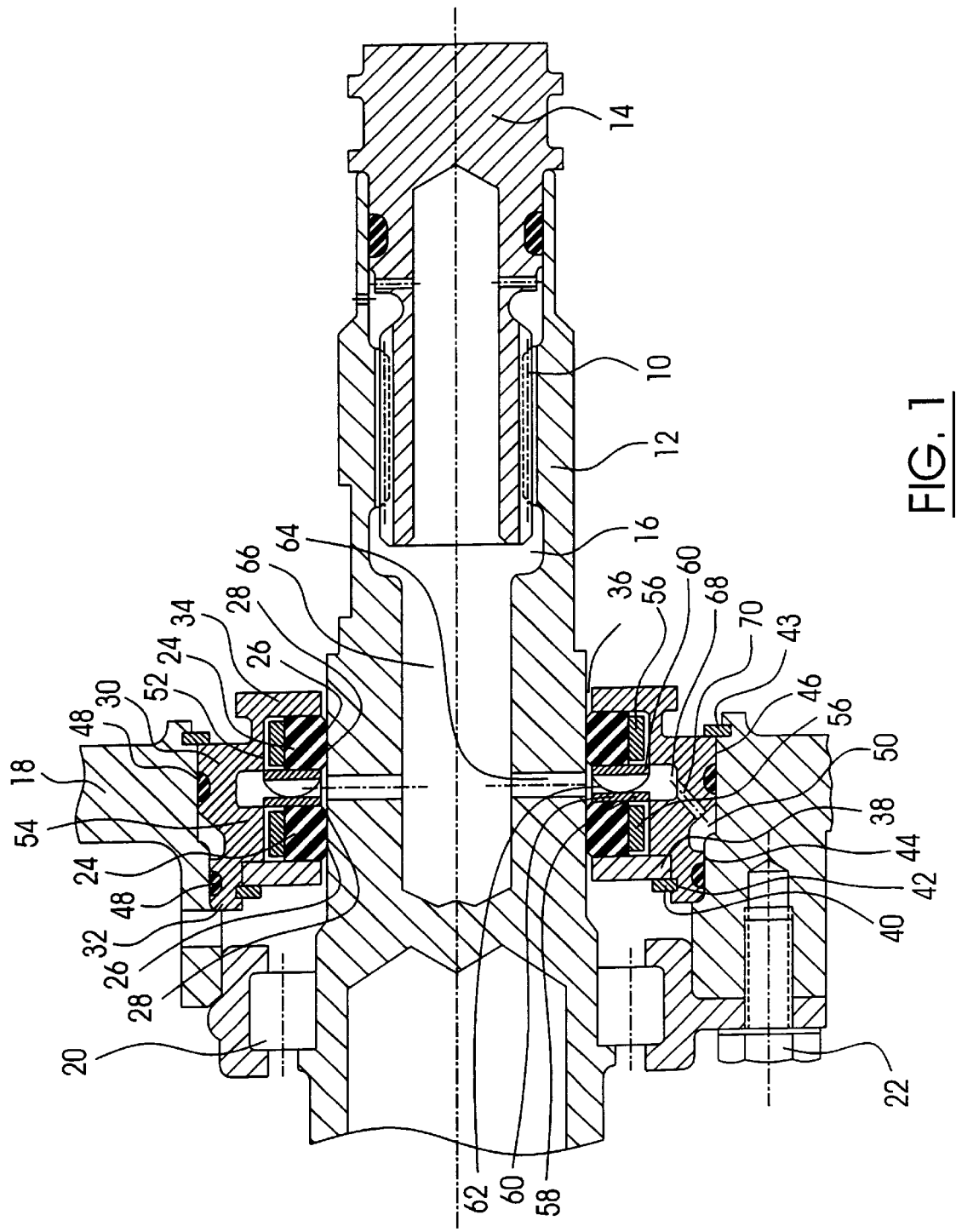
FIG. 1 is a cross-sectional view of an embodiment showing the apparatus and system in accordance with the present invention.

As shown in FIG. 1, drive splines 10 between an internally splined drive shaft 12 in a turbine engine and an externally splined accessory driven shaft 14 are lubricated by supply of lubricant fluid (not shown) delivered to an annular reservoir 16. The hollow drive shaft 12 is rotatably mounted in a housing 18 via a bearing set 20 which is secured to the housing with bolts 22. A pair of seals 24 having a substantially square cross-section surround the hollow drive shaft 12. The seals 24 which are preferably carbon sealing rings are spaced radially from the hollow drive shaft 12. A clearance 26 between an inner periphery of each of the seals 24 and an external of the shaft 12 ensures a formation of a film 28 of the lubricant fluid therebetween. A cylindrical retainer 30 has an open end 32 for inserting or removing the pair seals 24. The cylindrical retainer 30 also has a closed end 34 with a centric opening 36 for retaining the seals 24 from moving axially in one direction while permitting the hollow shaft to extend therethrough. A flat retainer washer 38 is provided at the open end 32 of the cylindrical retainer 30 for retaining the seals 24 from axial movement in the other direction, while permitting the hollow drive shaft 12 to extend therethrough. The flat retainer washer 38 is removably secured to the open end 32 by a retainer washer clip 40 which is received within an annular groove 42 at the open end 32 of the cylindrical retainer 30. The retainer 30 is removably inserted between an aperture in the housing 18 and the hollow drive shaft 12 which aperture also receives the hollow drive shaft and radially supports the bearing set 20. The cylindrical retainer 30, is retained to the housing by a retainer washer clip 43, includes a first peripheral surface 44 of a first diameter, and a second peripheral surface 46 of a second diameter larger than the first. Each of the first and second peripheral surfaces 44 and 46 radially retained by a corresponding inner surface of the aperture in the housing 18 and includes an O-ring seal 48 therebetween. An annular space 50 is defined between the first and second external surfaces 44 and 46 and between the cylindrical retainer 30 and the housing 18. The cylindrical retainer 30 has a inner periphery 52.

Each of the seals 24 is surrounded by an annular control ring 56. The control rings 56 are preferably rings having a coefficient of expansion similar to that of the drive shaft 12. Preferably, the control rings 56 are made of the same material as the drive shaft 12. The function of the control rings 56 is to control the width of the clearance 26 between the inner periphery of the seals 24 and an outer periphery of the shaft 12, as will be explained below in more detail.

A first of the seals 24 is positioned within the cylindrical retainer 30, abutting the closed end 34, radially spaced from the inner periphery 52 so that the sealing ring 24 together with the control ring 56 is not restrained from radial movement.

The second of the pair of seals 24 is positioned within the cylindrical retainer 30 abutting the flat retainer washer 38, which is secured to the open end 32 of the cylindrical retainer 30. The second seal 24 is radially spaced from the inner periphery 52 so that the seal 24 with its control ring 56 is not restrained from radial movement.

A spacer 58 which includes two flat washers 60 with a wave spring 62 therebetween is inserted between the seals 24. The two flat washers 60 respectively abut one of the seals 24 and the spring force exerted by the wave spring 62 constantly urges the flat washer 60 against the respective seals to prevent axial movement of the seals. If the configuration of the wave spring does not form a radial passage adequate to permit the lubricant fluid to flow at a sufficient rate into the interior 66 of the hollow drive shaft 12, one or more openings (not illustrated) may be provided in the wave spring 62, to increase the rate of flow through the radial passage formed between the flat washer 60 therebetween. An inner periphery of flat washers 60 are radially spaced from the external periphery of the hollow drive shaft 12. The spacer 58 is radially constrained by the inner periphery 52 of the retainer 30.

The radial passage between the two flat washers 60 of the spacer 58 aligns with a plurality of radial bores 64 which communicate with an interior 66 of the hollow drive shaft 12. Provided in the middle of the inner periphery 52 of the retainer 30 is an annular groove 68 from which a channel 70 extends outwardly to the annular space 50 to provide fluid communication between the space 50 and the interior 66 of the hollow drive shaft 12.

In operation, pressurized lubricant fluid is introduced from a stationary source through passages in the housing (not shown) into the annular space 50. The pressurized lubricant fluid enters the radial passage between the two flat washers 60 of the spacer 58 via the channel 70 and the annular groove 68. The pressurized lubricant fluid in the radial passage between the two flat washers 60 overcomes the centrifugal force generated by the rotating drive shaft 12 and discharges into the interior 66 of the rotating hollow drive shaft 12. Meanwhile, the lubricant fluid enters in the clearance 26 between the seals 24 and the rotating shaft 12 and forms the lubricant film 28 therebetween. The first and second seals 24 float on the film 28, so that they do not directly contact the drive shaft 12. Wear of both the seals 24 and the drive shaft 12 is thereby reduced.

It is essential that the drive shaft works properly at very high speeds and high temperatures. Because of fluctuations in operating temperature, the diameter of both the rotating drive shaft and the seals change. However, the changes in diameter are different due to the difference of the coefficient of expansion of the different materials of which the shaft and the seals are respectively made. Therefore, the width of clearance 26 can vary, which may affect the performance of the lubricant film 28. Consequently, the variation in the width of clearance 26 is due to changes in the operating temperature and is minimized by a compensative force exerted by the pair of control rings 56. The control rings 56, as explained above, are made of a material which has a coefficient of thermal expansion similar to that of the material of which the rotating drive shaft 12 is made. The control rings 56 are bonded to the seals 24 and therefore control their expansion/contraction to maintain the thickness of the lubricant changes. Modifications to the above-described preferred embodiment of the invention may become apparent to those skilled in the art. The scope of the invention is therefore intended to be limited solely by the scope of the appended claims.

The embodiments of the invention in which an exclusive property or privilege is claimed are defined as follows:

1. An apparatus for delivering a pressurized lubricant fluid from a source comprising a hollow shaft having an interior and rotatably mounted in a housing a pair of seals mounted around an external periphery of the hollow shaft, the pair of seals respectively having an inner periphery spaced from the external periphery of the hollow shaft for promoting a formation of a film of the lubricant fluid between the seals and the hollow shaft while inhibiting a free flow of the lubricant fluid therebetween, the seals being axially spaced apart and flanking a radial passage for having fluid communication with the source and the interior of the hollow shaft, and the seals being supported in an axially restrained, radially unrestrained position with respect to the housing so that the seals float on the film of the lubricant fluid.

2. An apparatus according to claim 1, wherein each of the seals includes a control ring for minimizing variations in a thickness of the film caused by changes in operating temperature.

3. An apparatus according to claim 2, wherein the seals comprise a pair of carbon rings.

4. An apparatus according to claim 3, wherein the control ring for minimizing variations in the thickness of the film surrounds each of the carbon rings, the control ring being of a material having a coefficient of thermal expansion substantially equivalent to that of the hollow shaft.

5. An apparatus according to claim 4, wherein the seals are supported within a retainer and separated by a spacer.

6. A method for delivering a pressurized lubricant fluid from a source including the steps of:

providing a hollow shaft having an interior which receives a pressurized lubricant fluid from a source, wherein said shaft is rotatably mounted in a housing;

supporting a pair of seals in an axially restrained, radially unrestrained position with respect to the housing, the seals surrounding an external periphery of the hollow shaft in a fixed, axially spaced apart position, an interior of each seal being spaced radially from the external periphery of the hollow shaft for promoting a formation of a film of the lubricant fluid between the seals and the hollow shaft while inhibiting a free flow of the lubricant fluid therebetween so that the seals float on the film of the lubricant fluid;

providing at least one bore in the hollow shaft which communicates with the interior of the hollow shaft and aligns with a radial passage formed between the pair of axially spaced-apart seals; and supplying pressurized lubricant fluid from the source to the radial passage to form the film of the lubricant upon which the seals float and deliver the lubricant fluid into the interior of the hollow shaft.

7. A method according to claim 6, wherein the seals are supported by a retainer removably secured to the housing.

8. A method according to claim 7, comprising a further step of providing control rings to control variations in a thickness of the film of the lubricant fluid, the control ring acting on a periphery of each of the seals.

9. A method according to claim 8, wherein the seals are separated by a spacer.

10. A method according to claim 9, wherein the control ring is made of material having a coefficient of thermal expansion similar to that of the material of the hollow shaft.

11. A system for delivering a pressurized lubricant fluid from a source comprising:

a hollow shaft having an interior which receives a pressurized lubricant fluid from a source, wherein said shaft is rotatably mounted in a housing;

a pair seals surrounding an external periphery of the hollow shaft, the pair of seals respectively having an inner periphery spaced from the external periphery of the hollow shaft to an extent that promotes a formation of a film of the lubricant fluid between the seals and the hollow shaft while inhibiting a free flow of the lubricant fluid therebetween, the seals being axially spaced apart and flanking a radial passage;

a retainer removably secured to the housing and supporting the seals in an axially restrained, radially unrestrained position with respect to the housing so that seals float on the film of the lubricant fluid and form the radial passage which is in fluid communication with the source; and a bore in the hollow shaft in fluid communication with the radial passage and the interior of the hollow shaft.

12. A system according to claim 11 further comprising a control ring for minimizing variations in a thickness of the film of lubricant fluid resulting from changes in operating temperatures.

13. A system according to claim 12, wherein the seals comprise a pair of carbon rings.

14. A system according to claim 13, wherein the control ring is bonded to each of the sealing rings, each control ring being of a material having a coefficient of thermal expansion similar to that of a material of the hollow shaft.

15. A system according to claim 11, wherein the retainer comprises:

a cylindrical body having an outer periphery, an inner periphery, an open end for receiving the seals and a closed end with a centric opening, the closed end inhibiting the seals from moving axially in one direction while permitting the hollow shaft to extend therethrough;

a retainer washer removably secured to the open end of the retainer for inhibiting the seals from axial movement in the other direction while permitting the hollow shaft to extend therethrough;

a spacer which separates the pair of seals;

the cylindrical body being situated within an opening in the housing, which opening is co-axial with the hollow shaft, a channel extending through the cylindrical body and communicating with the radial passage and the stationary source via a passage in the housing.

* * * * *